Aug. 16, 1955 D. G. SOUSSLOFF ET AL 2,715,308

METHOD OF AND APPARATUS FOR TWISTING AND WINDING

Filed Jan. 11, 1950 8 Sheets-Sheet 1

INVENTORS
Dimitri G. Soussloff
Carlton A. Steele
Raymond V. Tata
BY
Watson, Cole, Grindle + Watson Aug. 16, 1955 D. G. SOUSSLOFF ET AL 2,715,308

METHOD OF AND APPARATUS FOR TWISTING AND WINDING

Filed Jan. 11, 1950 8 Sheets-Sheet 2

INVENTORS
Dimitri G. Soussloff
Carlton A. Steele
Raymond V. Tata
BY
Watson, Cole, Grindle & Watson

METHOD OF AND APPARATUS FOR TWISTING AND WINDING

Filed Jan. 11, 1950 8 Sheets-Sheet 3

INVENTORS
Dimitri G. Soussloff
Carlton A. Steele
Raymond V. Tata
BY
Watson, Cole, Grindle & Watson Aug. 16, 1955 D. G. SOUSSLOFF ET AL 2,715,308

METHOD OF AND APPARATUS FOR TWISTING AND WINDING

Filed Jan. 11, 1950 8 Sheets-Sheet 4

INVENTORS
Dimitri G. Soussloff
Carlton A. Steele
Raymond V. Tata
BY
Watson, Cole, Grindle + Watson Aug. 16, 1955 D. G. SOUSSLOFF ET AL 2,715,308

METHOD OF AND APPARATUS FOR TWISTING AND WINDING

Filed Jan. 11, 1950 8 Sheets-Sheet 5

INVENTORS
Dimitri G. Soussloff
Carlton A. Steele
Raymond V. Tata
BY
Watson, Cole, Grindle & Watson

METHOD OF AND APPARATUS FOR TWISTING AND WINDING

Filed Jan. 11, 1950 8 Sheets-Sheet 6

INVENTORS
Dimitri G. Soussloff
Carlton A. Steele
Raymond V. Tata
BY
Watson, Cole, Grindle & Watson

METHOD OF AND APPARATUS FOR TWISTING AND WINDING

Filed Jan. 11, 1950 8 Sheets-Sheet 7

INVENTORS
Dimitri G. Soussloff
Carlton A. Steele
Raymond V. Tata
BY
Watson, Cole, Grindle + Watson INVENTORS
Dimitri G. Soussloff
Carlton A. Steele
Raymond V. Tata
BY
Watson, Cole, Grindle & Watson 2,715,308
Patented Aug. 16, 1955

1

2,715,308

METHOD OF AND APPARATUS FOR TWISTING AND WINDING

Dimitri G. Soussloff, Providence, Carlton A. Steele, Norwood, and Raymond V. Tata, Providence, R. I., assignors to Universal Winding Company, Boston, Mass., a corporation of Massachusetts Application January 11, 1950, Serial No. 138,038

58 Claims. (Cl. 57—58.65)

This invention relates to a winding and twisting apparatus and method of winding and twisting yarn and more particularly relates to an apparatus adapted to wind a strand of material at a constant speed and adapted to impart a uniform twist to the material being wound, and a method of winding and twisting the output of a synthetic fiber producing apparatus.

In the present specification and claims the term "yarn" is used in a general sense to indicate any type of attenuated material and the word "package" is intended to designate a wound mass of yarn whatever its form or shape.

This invention is particularly adapted for use with a continuous process apparatus for spinning and treating synthetic yarn such as rayon. The invention will be described herein as applied to such a process, but it will be understood that it is not intended thereby to limit it to such use.

A comparatively recent development in the manufacture of viscose type rayon yarn has been the introduction of the so-called continuous processes wherein the yarn as it comes from the spinnerets is passed through a series of operations designed to coagulate, wash and dry the fibers. The yarn, as it emerges from the continuous process is a flat yarn, i. e. a yarn without any twist, this flat yarn usually is twisted by means of a ring twister or a cap twister and wound on a bobbin or spool. The yarn itself as it is wound on the bobbin or spool thus formed is suitable for use by the customer, i. e. no further chemical treatment or twisting is required. However, the fact that the yarn is on a bobbin or spool makes it necessary to rewind it onto cones or tubes to provide a self-supporting package suitable for shipment and subsequent use by the purchaser.

Another disadvantage of the present method of twisting and winding the output of a continuous process spinning machine is the lack of uniformity in the twist imparted to the yarn by the ring twisters and cap twisters that is the result of the increase in the diameter of the spool or bobbin as the yarn builds up thereon. Inasmuch as it is customary to insert only a low twist in the yarn at this time, from one and one-half to ten turns per inch, the variation in twist imparted by the ring and cap twisters can be a large proportion of the desired twist.

It is accordingly a primary object of the present invention to provide an apparatus for winding and twisting the output of a continuous process synthetic fiber spinning apparatus whereby a wound package of twisted yarn is produced having a substantially uniform twist throughout its length and being in suitable form for shipment and for use directly in a subsequent operation.

It is another object of the present invention to provide an automatically threadable take-up mechanism for the output of a synthetic fiber apparatus.

It is another object of the present invention to provide a multiple twist spindle, adapted to wind the strand of material twisted thereby into a package, and having means to facilitate threading said spindle with said strand.

2

It is another object of the present invention to provide a multiple twist spindle, adapted to wind the strand of material twisted thereby into a package, and having means to automatically thread said spindle with said strand.

Another object of the present invention is to provide a multiple twist spindle adapted to twist a strand of material and simultaneously wind the strand twisted thereby into a package, having means for storing, separate from said package, that portion of said strand twisted by said spindle prior to the time it attains its predetermined operating speed.

Another object of the present invention is to provide a multiple twist spindle adapted to twist a strand of yarn and simultaneously wind the yarn twisted thereby into a package, having means for winding a transfer "tail" comprising an extension of the inside layer of said package wound adjacent one end thereof and available as a means of interconnecting two packages.

Another object of the present invention is to provide a multiple twist spindle adapted to twist a strand of material and wind the twisted strand into a package, having means associated therewith for controlling the density of the package formed.

Another object of the present invention is to provide a multiple twist spindle adapted to twist a strand of material and simultaneously wind the strand twisted thereby into a package, having means for winding a transfer tail prior to winding said package and having means for storing a predetermined initial length of said strand prior to winding said transfer tail.

Another object of the present invention is to provide means for rapidly threading a multiple twist spindle.

Another object of the present invention is to provide means to store the starting end of a strand of material passing through a multiple twist spindle, that is adapted to wind the twisted strand into a package, until the spindle is up to speed and imparting full twist to said strand.

Another object of the present invention is to provide a self-threading furnishing device for use in a multiple twist spindle.

Another object of the present invention is to provide a multiple twist spindle adapted to wind the material twisted thereby into a package, having means for automatically threading said spindle and for controlling the density of said package.

Another object of the present invention is to provide a method of imparting a uniform twist to the yarn produced by a continuous process synthetic fiber spinning apparatus and simultaneously winding the twisted yarn into marketable package.

Other objects of the invention will in part be obvious and will in part appear hereinafter.

The invention accordingly comprises the apparatus possessing the construction, combination of elements and arrangement of parts, and the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

The present invention comprises an apparatus for twisting yarn and winding the yarn twisted into a self-supporting package, and the method of producing a synthetic yarn and winding said yarn as it is produced into a marketable package wherein the yarn has a uniform twist throughout its length. The apparatus is particularly adapted for use with continuous process rayon spinning machines, and is described in detail herein in connection with such spinning apparatus. However, it will be obvious to those skilled in the art, that the device will have many other applications and it is not intended to limit the invention to use with continuous process rayon spinning equipment.

The apparatus of the present invention comprises a multiple twist spindle of the type wherein two turns of twist are imparted to the yarn being twisted for every single revolution of the spindle and the yarn twisted is wound into a package inside of the balloon generated by the yarn as it is twisted. The spindle of the apparatus is hollow and is adapted to function as an injector to thread a strand of yarn through said apparatus. A winding arbor is provided to wind the twisted yarn into a package, and a supplemental winding cylinder is provided to wind the initial run of the yarn until the spindle and flyer are up to speed. A starting yarn guide is provided to traverse the yarn across the supplemental cylinder, transfer it from said cylinder to the winding arbor when the spindle is up to speed, and to guide it across a predetermined portion of said arbor to form a transfer tail. A second yarn guide is provided to engage the yarn after the transfer tail is found and traverse it back and forth along a predetermined length of the arbor to cause a cross wound package to be formed thereon. A set of furnishing rolls is provided to engage the yarn after the second yarn guide starts to traverse it. The furnishing rolls engage the yarn automatically and function to relieve the tension imparted thereto by the rotating yarn balloon, and to cause the yarn to be wound into the package at a predetermined desired tension.

A plurality of the twisting and winding apparatus of the present invention, one for each spinneret included therein, are coupled to, synchronized with and driven by a continuous process synthetic fiber spinning apparatus by utilizing power obtained either directly or indirectly from the main driving motor of said spinning apparatus.

The method of the present invention comprises inserting a predetermined uniform number of turns per unit length in the output of a synthetic fiber spinning apparatus and winding the strand thus twisted into a package.

Figure 1:
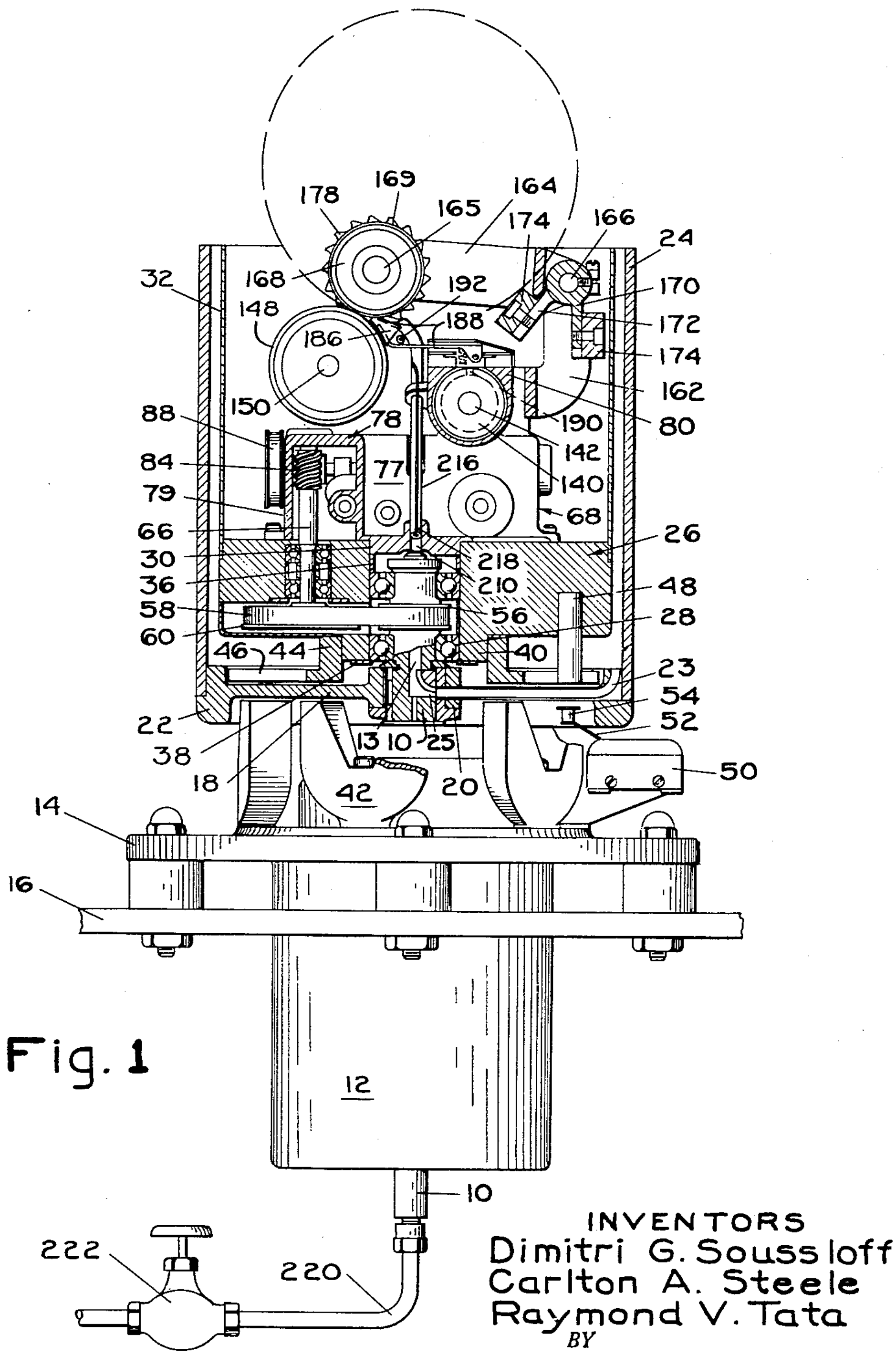
Figure 1 is a somewhat diagrammatic side elevation of a preferred embodiment of a winding and twisting device comprising the present invention with parts thereof in section taken along the line I—I of Fig. 7 and looking in the direction of tthe arrows.
Figure 2:
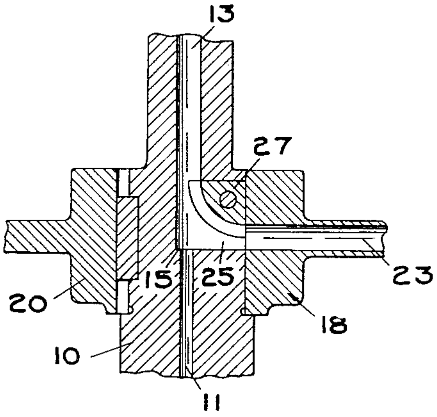
Fig. 2 is an enlarged fragmentary sectional view showing parts of the spindle and flyer and the yarn and air paths therethrough.

Referring now to the drawings, there is disclosed at Fig. 1 a preferred embodiment of the invention comprising a substantially vertical hollow spindle 10 rotated by and forming the shaft of a synchronous electric motor 12. The bore of hollow spindle 10 extends axially throughout its length and is divided into two sections having different diameters. The diameter of lower bore section 11 (Fig. 2) is smaller than the diameter of upper bore section 13. The two bore sections 11 and 13 come together at a point above the top of motor 12 to form an upwardly facing annular shoulder 15. Motor 12 is mounted by means of flange 14, which forms part of its housing, to any convenient frame 16. A disc-like flyer 18, formed from a nonmagnetic material, is mounted on and concentric with spindle 10 around annular shoulder 15 for rotation thereby by means of flyer hub 20, which engages spindle 10 and is keyed thereto. The outer periphery of flyer 18 is provided with a flange 22. A cylindrical shell 24 is seated in a rabbet formed in the outer edge of flange 22 and is attached thereto by any convenient means. A radial bore 23 in flyer 18 communicates with a radial hole 25 in upper section 13 of spindle 10 adjacent to annular shoulder 15 to provide a yarn passage from the upper edge of flange 22 closely adjacent to the inner surface of cylindrical shell 24 into the axial opening in spindle 10. An arcuate segment 27 is inserted in the wall of spindle 10 to form a wear resistant surface for the yarn to pass over as it travels from radial bore 23 into the upper section 13 of said spindle.

The mechanism thus far described functions in the manner of multiple twist spindles, old in the art, that are adapted to insert two turns of twist in the strand of material being twisted for each revolution of the spindle. The yarn to be twisted passes through any convenient yarn guide 29, Figs. 14 and 15, located axially above hollow spindle 10, downwardly along the inner surface of cylindrical shell 24, which supports the balloon formed in the yarn by the rotation of flyer 18, through radial bore 23 and up through the bore of hollow spindle 10 to the novel take-up mechanism to be described in detail hereinafter.

A platform 26 for supporting the package being wound and the mechanism for winding it is carried by spindle 10 inside of shell 24 by means of bearings 28 journaled on the spindle and in an axial opening 30 in the platform. Bearings 28 are held in opening 30 by means of upper and lower retaining rings 36 and 38 respectively. A cylindrical guard 32 is firmly attached to platform 26 at its periphery and functions to prevent the yarn being twisted from catching on any of the take-up mechanism should the baloon formed by the yarn be contracted momentarily for any reason.

A plurality of magnets 42 are equally spaced around motor mounting flange 14 with their pole pieces located closely adjacent to the lower surface of flyer 18. An armature 44, formed from magnetic material, having radial pole pieces 46 that conform in circumferential spacing to the poles of magnets 42 is carried by an annular flange 40 around opening 30 at the bottom of platform 26. Armature 44 is so positioned on flange 40 that its pole pieces 46 are closely adjacent to the upper surface of flyer 18, whereby the magnetic flux from magnets 42 exerts a holding force on pole pieces 46 to prevent platform 26 from being rotated by spindle 10.

A bar magnet 48 is carried by platform 26 with one of its ends closely adjacent the upper surface of flyer 18. An electrical switch 50, connected in series with motor 12, having an actuating arm 52 which carries an armature 54 of magnetic material at its end is located on flange 14 and radially spaced from spindle 10 such a distance that magnet 48 can be located over armature 54. When armature 54 is located under magnet 48 the magnetic flux from magnet 48 attracts armature 54 and causes it to hold arm 52 up and the contacts of switch 50 closed to permit motor 12 to operate and rotate spindle 10. If platform 26 should start to rotate with spindle 10, as in the event one or more of the bearings 28 should fail, the movement of magnet 48 away from armature 54 permits switch actuating arm 52 to fall thus breaking the power circuit to motor 12 and causing the unit to stop.

Figure 3:
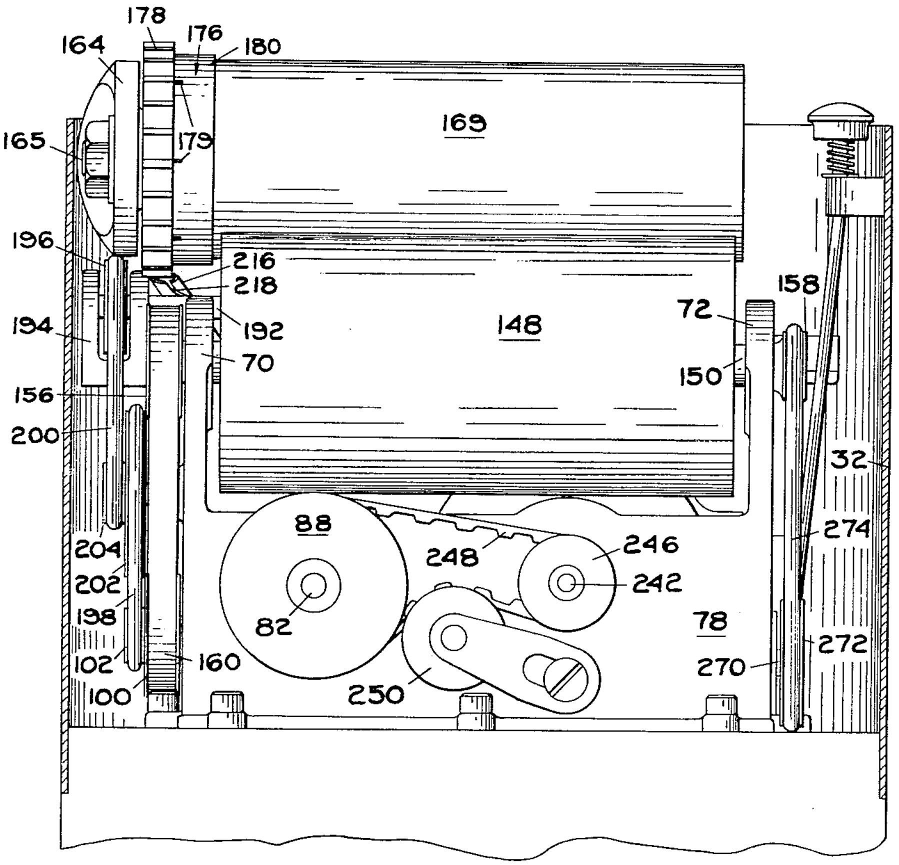
Fig. 3 is a front elevation of the winding or take-up portion of the apparatus with the enclosing shell broken away.

A frame 68, adapted to support the components which cooperate to wind a self-supporting package of yarn, is mounted on the upper surface of platform 26. Frame 68 is preferably a casting and is comprised of left and right end plates 72 and 70 respectively (Figs. 3, 5 and 7), the lower portions of which are connected by an L-shaped housing. One leg 76 of said L-shaped housing has an inner wall 77 extending along end plate 70, and its other leg 78 has an inner wall 79, connecting the two end plates. End plates 70 and 72 are connected at the rear of their upper halves by a generally cylindrical cam housing 80 (Fig. 1).

Figure 7:
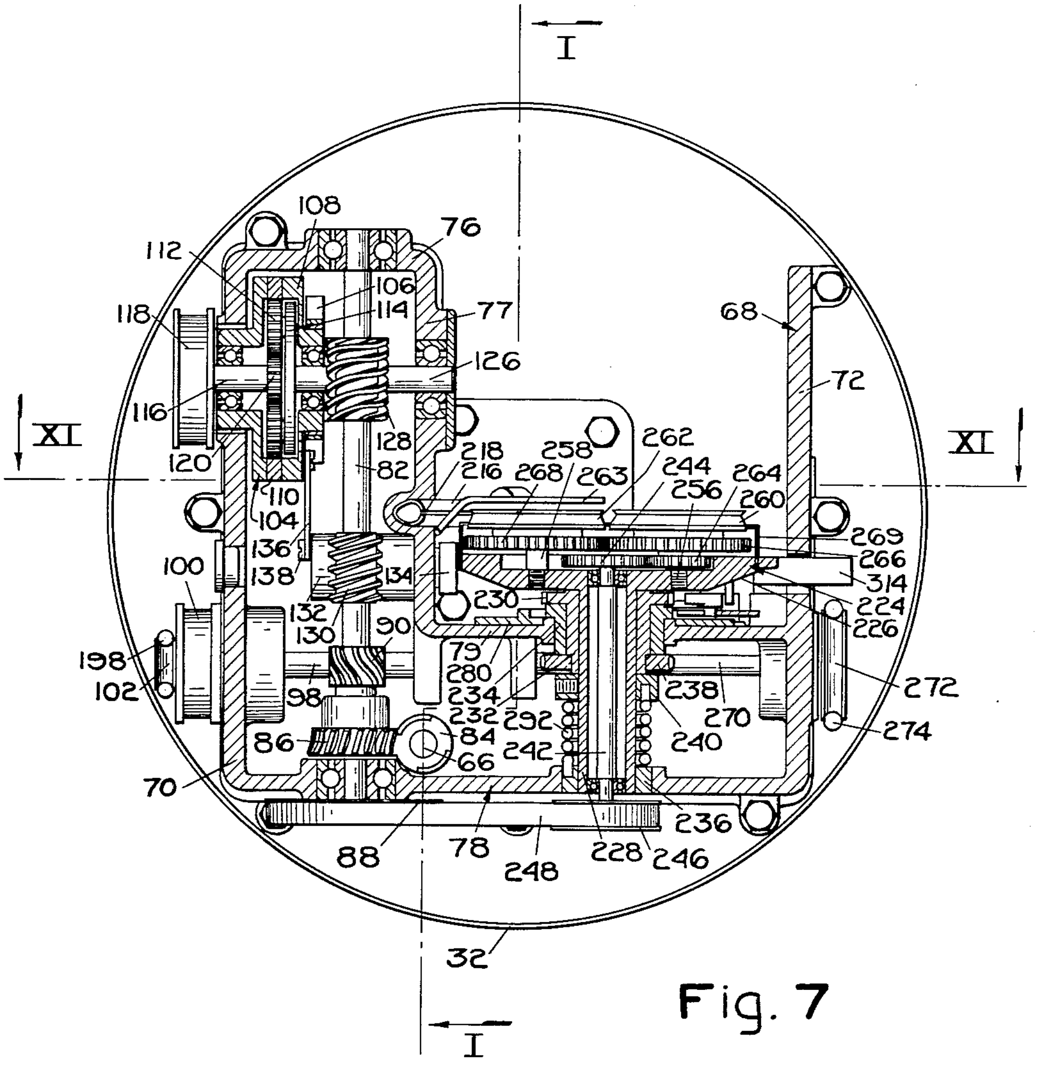
Fig. 7 is a sectional view taken along the line VII—VII of Fig. 5 and looking in the direction of the arrows.

A vertical shaft 66, Figures 1 and 7, having its lower end journaled in platform 26 by means of a suitable bearing and its upper end journaled in leg 78 of frame 68, is rotated by means of pulleys 56 and 60 carried by spindle 10 and the lower end of shaft 66 respectively and belt 58. A horizontal shaft 82 extends throughout the length of leg 76 of frame 68 and is mounted for rotation therein by means of suitable bearings in the ends of said leg 76. The upper end of shaft 66 is provided with a worm 84 which is in driving engagement with a worm gear 86 carried by horizontal shaft 82. Shaft 82 projects out of frame 68 at the front thereof and has mounted on the end thus projecting from frame 68 a pulley 88, the function of which will be explained in detail hereinafter. A worm 90 is carried by shaft 82 adjacent to worm gear 86. Worm 90 is in driving engagement with a worm gear 96 (Fig. 5) carried by horizontal shaft 98 which extends transversely of leg 76 of frame 68 and is suitably journaled for rotation therein. One end of shaft 98 projects through end plate 70 and has fixedly mounted thereon pulleys 100 and 102, the function of which will be explained more in detail hereinafter.

A planetary gear type ribbon breaker 104 is journaled in end plate 70 and a bearing block 106 located adjacent the other end of shaft 82. Ribbon breaker 104 is comprised of a cylindrical housing 108 having end cover plates, each provided with an axial boss by means of which the cylindrical housing is mounted for rotation in end plate 70 and bearing block 106. A portion of the inner surface of cylindrical housing 108 is provided with internally facing gear teeth to form ring gear 110. A shaft 116 is journaled in the axial boss carried by one end cover plate and has sun gear 120 mounted on its end within cylindrical housing 108. The other end of shaft 116 projects through end plate 70 and has a pulley 118 secured thereto. A plurality of planet gears 112 are rotatably carried by a disc 114 and in mesh with ring gear 110 and sun gear 120. Disc 114 is carried by the end of shaft 126 for rotation thereby, and shaft 126 is journaled adjacent said disc 114 in the axial boss carried by the other cover plate, and extends across leg 76 of frame 68 and has its other end journaled in inner wall 77. Shaft 126 is rotated by shaft 82 by means of a worm 128 carried by shaft 82 adjacent to ribbon breaker 104 and in mesh with a worm gear, not shown, carried by shaft 126. A third worm 130 is mounted on shaft 82 between the worms 90 and 128 and meshed with a worm gear 131 carried by crank block 132. Crank block 132 is rotatably mounted on stub shaft 134 which is supported by the inner wall 77 of leg 76. A connecting rod 136 connects cylindrical housing 108 of ribbon breaker 104 to the crank pin 138 of crank block 132. The ribbon breaker mechanism functions to continuously increase and decrease the speed of pulley 118 used to drive the yarn traversing mechanism, which will be explained in detail hereinafter, and effectually prevents the yarn being wound from laying one turn upon a preceding turn. As shaft 82 revolves, worm 128 rotates shaft 126, disc 114, and planet gears 112, causing said planet gears 112 to roll around ring gear 110. The rotation thus imparted to planet gears 112 rotates sun gear 120, shaft 116 and pulley 118. The rotation of shaft 82, through worm 130 and worm gear 131, also rotates crank block 132 which, by means of connecting rod 136, oscillates the cylindrical housing 108 and ring gear 110. The oscillation of ring gear 110, depending upon whether it is rotating with or opposite to planet gears 112, causes an increase and decrease in the speed of revolution of sun gear 120 and shaft 116.

A barrel cam 140, having a reversing groove formed in its surface, is rotatably supported by means of shaft 142 in cam housing 80. Shaft 142 (Fig. 4) is journaled in end plates 70 and 72 and has one end projecting through end plate 70 on which is mounted pulley 144. A belt 146 connects pulleys 118 and 144 whereby pulley 118 drives pulley 144, and through it drives cam 140.

A driving roll 148 (Figs. 3 and 4), preferably cork covered in the manner old in the art, is rotatably mounted on end plates 70 and 72 by means of shaft 150. Each end of shaft 150 extends through its respective end plate. The end of shaft 150, which extends through end plate 70, has pulley 156 mounted thereon, and the end which extends through end plate 72, has pulley 158 mounted thereon. Pulley 100 by means of belt 160 drives pulley 156 and through it and shaft 150 rotates driving roll 148.

An upwardly extending bracket 162 attached to and carried by the back edges of end plates 70 and 72 has one end of arm 164 pivotally attached thereto by means of pivot pin 166. Arm 164 is fastened to pivot pin 166 by means of set screws (not shown) whereby said pivot pin 166 is rotated by arm 164 as it pivots. An arbor 168 suitable for holding a paper tube 169, or similar core suitable for receiving a winding of yarn, is rotatably mounted on the other end of arm 164 by means of spindle 165. Arm 164 is of such a length that it holds the paper tube 169 carried by arbor 168 in contact with driving roll 148 so that said core and arbor are rotated thereby to cause the yarn being twisted by the apparatus to be wound thereon to provide the desired package. As the package being wound increases in diameter, arm 164 pivots upwardly to permit package growth. As the package increases in diameter its weight also increases, and this increase in weight, if not compensated, has an adverse effect on the package. Means are provided for compensating for this increase in weight, comprising a pair of arms 170 and 172 (Fig. 1) attached at one end to pivot pin 166 and each carrying a permanent magnet on its other end. The arm 170 is rigidly attached to pivot pin 166 by means of a set screw whereby it is rotated by pivot pin 166. Arm 172 is free to rotate around pivot pin 166 but the extent to which it can swing downwardly is limited to the position shown in Fig. 1 by a pin, not shown, which projects from its side and engages bracket 162. Magnets 174 are positioned on arms 170 and 172 with their opposite poles towards each other so that there is a strong attraction between them. It will, therefore, be seen that as arm 164 raises, due to the increase in diameter of the yarn package being wound on arbor 168, the two magnets 174 are brought increasingly closer together. As the two magnets get closer together the attraction of one for the other increases and this attraction pulling on arm 170 tends to lift arm 164 and thus reduces the pressure of the package being wound on drive roll 148.

A waste take-up roll 176 (Figs. 3, 4 and 5), adapted to catch the end of the strand of yarn as it is threaded into the apparatus and wind and store the yarn until such time as flyer 18 is up to speed and imparting the desired number of turns per unit length to the yarn, is rotatably mounted on spindle 165 between arbor 168 and the end of arm 164. Waste roll 176 is comprised of a turbine wheel 178 rotatably mounted on spindle 165 and adapted to be rotated by a blast of air, in a manner to be explained more in detail hereinafter, and having a plurality of circumferentially spaced yarn entangling pins 179 located adjacent its periphery. A cylindrical shell 180 having an outside diameter equal to or slightly greater than the outside diameter of core 169 and adapted to serve as a winding and storage drum for the yarn prior to its attaining full twist, is secured to turbine wheel 178 concentric with the axis thereof and inside of said pins 179. A centrifugal governor and an over-running clutch, neither of which is shown, but which can be of any convenient design are carried by turbine wheel 178 and/or cylindrical shell 180 interiorly thereof. The governor functions as a safety device to prevent waste roll 176 from attaining such a high speed when operated without any load thereon that it might disintegrate. The clutch permits waste roll 176 to be rotated at a higher speed than arbor 168 or when said arbor is stationary, and permits said arbor to rotate said roll when it is not being driven.

A yarn guide 186 (Fig. 1) is carried by one end of traverse arm 188 and held thereby closely adjacent driving roll 148 and in a position where it can be lightly contacted by the paper tube or core 169 on arbor 168, or the yarn wound thereon. Yarn guide 186 and traverse arm 188 are reciprocated across a predetermined length of core 169 to build a cross-wound package thereon by means of barrel cam 140 and cam follower 190 which carries the other end of traverse arm 188. Cam follower 190 is supported for its reciprocating motion by means of suitable guide surfaces formed on or carried by cam housing 80. Yarn guide 186 may be any convenient self-threading type yarn guide.

Figure 4:
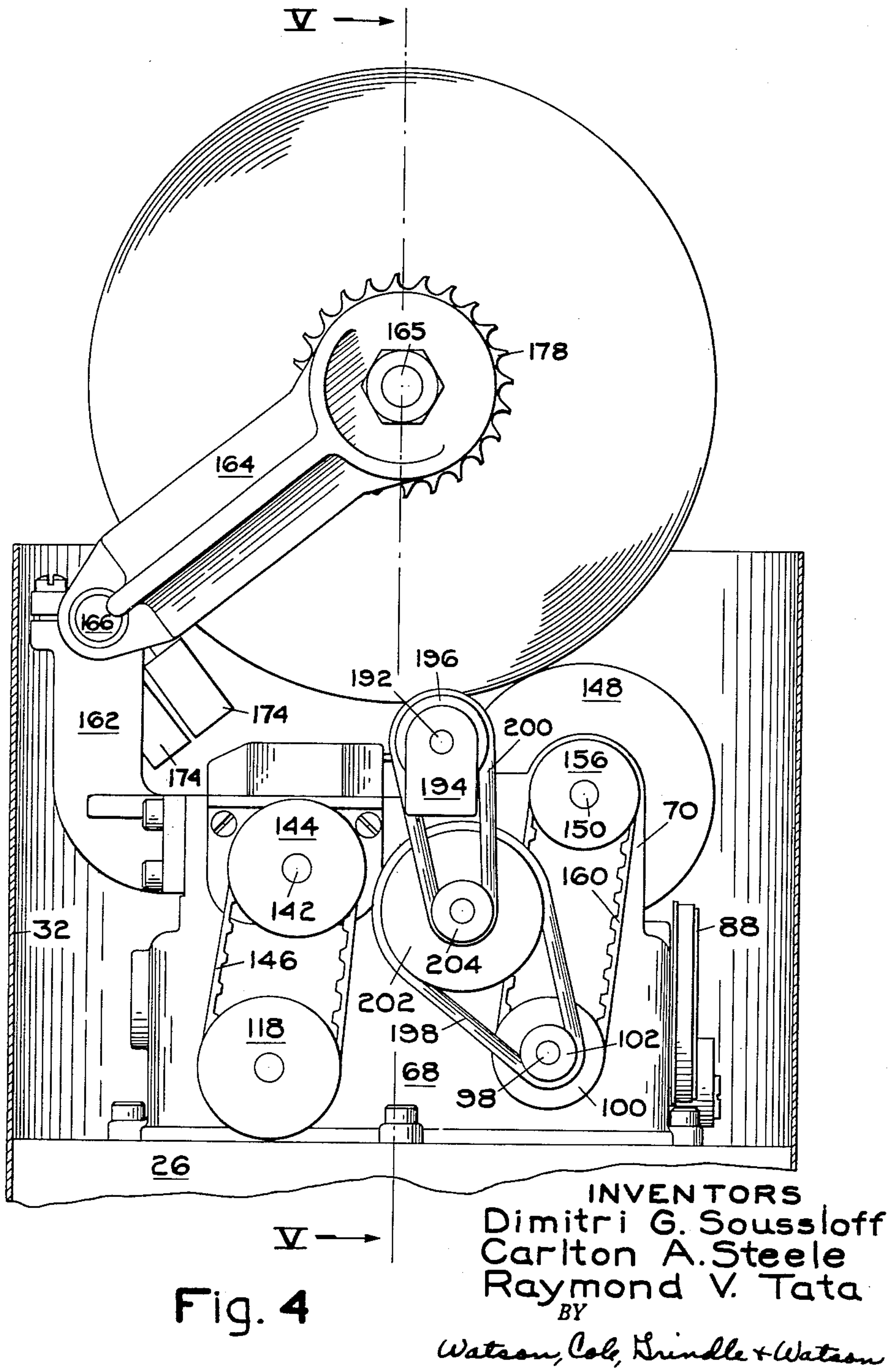
Fig. 4 is an elevation of the right hand side of the winding or take-up portion of the apparatus with the enclosing shell broken away.
Figures 5, 6:
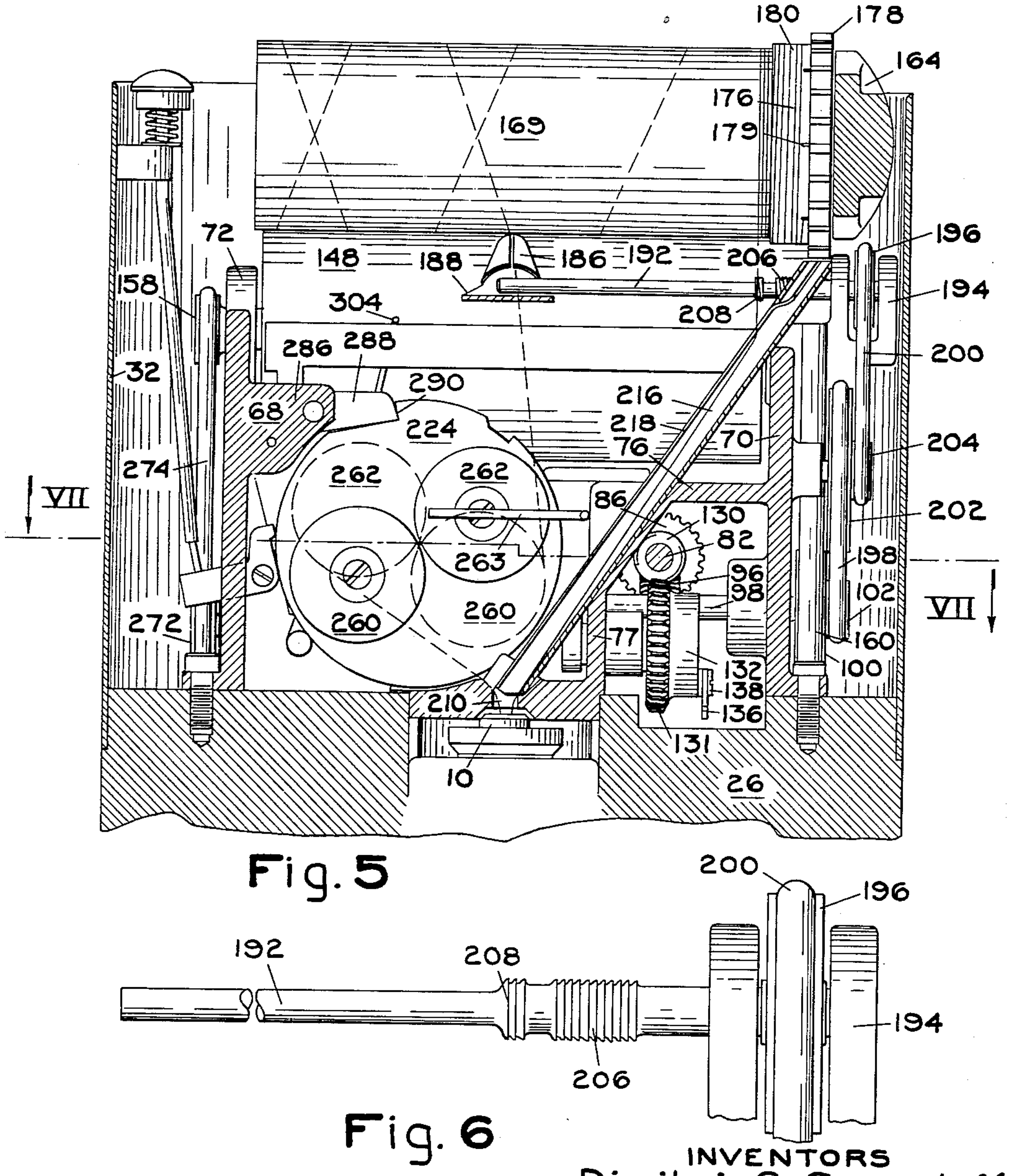
Fig. 5 is a sectional elevation of the winding or take-up portion of the apparatus taken along the line V—V of Fig. 4 and looking in the direction of the arrows.
Fig. 6 is an enlarged view of the tailing screw.

A rotary shaft-like yarn guide 192, Figs. 5 and 6, is rotatably mounted on end plate 70 by means of a bifurcated boss 194 which provides a cantilever suspension for said guide 192 whereby it extends parallel to, and substantially half way along, driving roll 148 and arbor 168 and closely adjacent thereto but with yarn guide 186 interposed between it and said arbor and driving roll. Rotary yarn guide 192 is driven by pulley 196 carried thereby and located between the two ears of the bifurcated boss 194. Pulley 196 is driven by pulley 102 carried by shaft 98 by means of belts 198 and 200 acting through intermediate pulleys 202 and 204 (Fig. 4).

A waste feeding screw thread 206 is located on rotary yarn guide 192 opposite cylindrical shell 180 of waste take-up roll 176. A second screw thread 208 is located on rotary yarn guide 192 spaced laterally thereon from waste feeding screw thread 206 and opposite that portion of arbor 168 and core 169 that is to receive the transfer tail.

An opening 210 is provided in the bottom of frame 68 in axial alignment with the bore of hollow spindle 10 to provide a yarn passage therethrough to permit the passage of yarn from spindle 10 to the winding and take-up mechanism.

Figure 9:
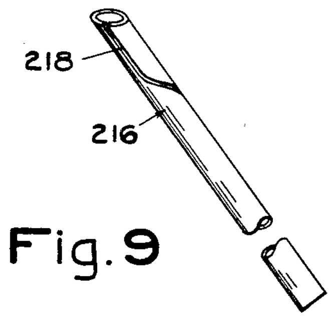
Figs. 9 and 10 are front and side elevations respectively of the threading tube.
Figure 10:
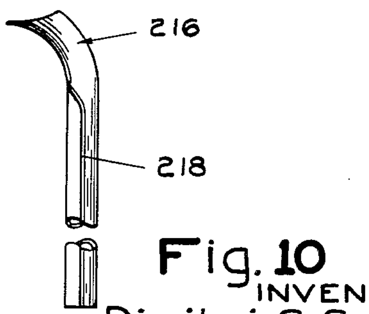

A goose-necked threading tube 216, Figs. 9 and 10 curved at one end and substantially straight throughout the remainder of its length has its straight end fixed in opening 210, extends upwardly therefrom at an angle toward turbine wheel 178 and has the opening at its curved end closely adjacent to, and directed at, the buckets formed in said turbine wheel, whereby a blast of air passing through tube 216 will rotate turbine wheel 178 and with it waste take-up roll 176. Goose-necked threading tube 216 is provided throughout its length with a slot 218 that is substantially straight throughout the straight portion of tube 216 and is located on the uppermost side of said tube, i. e. the side of the tube facing the axis of spindle 10. At the point where tube 216 commences to curve towards turbine wheel 178, slot 218 spirals around the tube substantially 90 degrees and continues to its end in the inner side wall of the curve or goose-neck. A conduit 220, leading to a source of compressed air and provided with a suitable valve or other control means 222, is connected to the lower end of hollow spindle 10 by any convenient rotating connector. Conduit 220 is adapted to direct a blast of compressed air upwardly through hollow spindle 10 and goose-necked threading tube 216 to thread the yarn to be twisted through the apparatus.

The above mentioned threading is accomplished by introducing the end of the yarn to be twisted into, or adjacent to, the outer end of radial bore 23 of flyer 18 and causing a blast of compressed air from conduit 220 to pass up through spindle 10 and tube 216. The blast of air passing through spindle 10 causes it, by reason of the different diameters of its bore and the location of radial hole 25 to function as an injector and draw air in through radial bore 23. The air thus drawn through bore 23 carries the end of yarn to be twisted and wound through said bore. Once the end of the yarn reaches the interior of hollow spindle 10, the blast of air passing therethrough carries it up through said spindle 10 and tube 216 and discharges it against circumferential pins 179 of waste take-up roll 176. By the time the yarn is discharged against waste take-up roll 176 it is rotating rapidly due to the air blast directed against turbine wheel 178 by tube 216. The yarn end is immediately entangled on pins 179 and the rotation of waste take-up roll 176 continues to draw the yarn through flyer 18, spindle 10, and tube 216.

Figure 8:
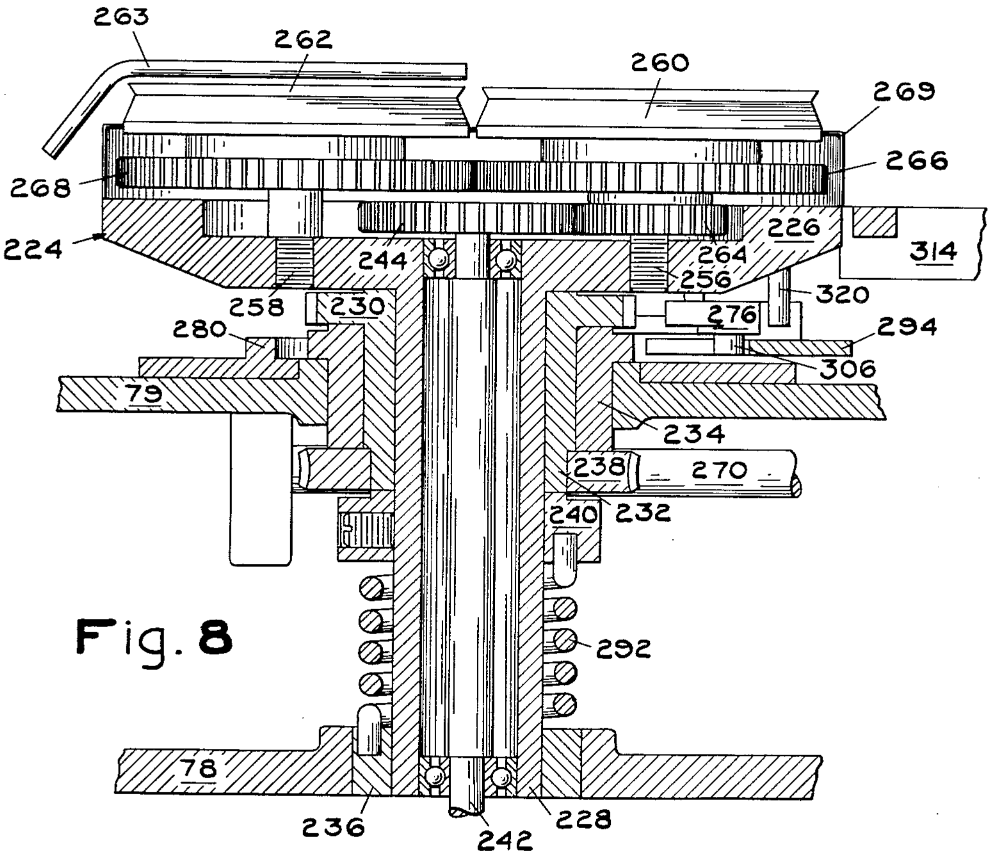
Fig. 8 is an enlarged sectional view of the furnishing roll assembly.

It is important that the yarn be wound onto the package at a definite predetermined tension to provide a package having the proper density. To relieve the drag on the yarn caused by spindle 10, flyer 18 and the balloon of the yarn, which otherwise would result in a tension excessively high for proper package formation, a self-threading furnishing roll assembly 224 (Figs. 7, 8 and 11) is provided. Furnishing roll assembly 224 comprises a circular housing member 226 and a hollow shaft 228 formed integrally with said housing member 226 and axially aligned therewith. A ratchet wheel 230 carried by, and preferably formed integrally with, sleeve 232 is rotatably mounted on shaft 228 by means of said sleeve 232 adjacent housing member 226. Hollow shaft 228 extends across and is journaled in leg 78 of frame 68 by means of bushing 236 in the outer wall of leg 78, which forms a bearing for its end, and bushing 234 in inner wall 79 of leg 78, which forms a bearing for sleeve 232, whereby sleeve 232 is free to rotate in bushing 234 and shaft 228 is free to rotate in sleeve 232. Furnishing roll assembly 224 is maintained in position in frame 68 by means of worm gear 238 carried by sleeve 232 in abutting relation to one end of bushing 234 and ratchet wheel 230 abutting the other end thereof to locate sleeve 232 and ratchet wheel 230, and a locking ring 240 clamped on shaft 228 in abutting relation to one end of sleeve 232 and circular housing member 226 abutting the other end of said sleeve 232 adjacent said ratchet wheel. A shaft 242 is journaled in hollow shaft 228 by means of suitable bearings for rotation relative thereto. One end of shaft 242 extends into circular housing member 226 and has gear 244 mounted thereon, and its other end extends out of hollow shaft 228 and outside of frame 68 and has pulley 246 mounted thereon. Pulley 246, shaft 242 and gear 244 are driven by pulley 88, carried by shaft 82, by means of belt 248. An idler pulley 250 (Fig. 3) bears against belt 248 between pulleys 88 and 246 and is adapted to take up any slack in said belt 248 that may result from changing either pulley 88 or 246 to vary the speed ratio between shafts 82 and 242.

Two stub shafts 256 and 258 are supported by circular housing member 226 with their axes parallel to each other and parallel to the axis of shaft 242. A pair of furnishing rolls 260 and 262 having substantially the same diameter are carried by stub shafts 256 and 258 respectively for rotation thereon. A gear 264 fixedly mounted on the hub of furnishing roll 260 is meshed with, and driven by, gear 244. A second gear 266 is also fixedly mounted on the hub of furnishing roll 260 between said roll 260 and gear 264 and is in driving engagement with a similar gear 268 fixedly mounted on the hub of furnishing roll 262 whereby said rolls 260 and 262 are rotated in opposite directions at the same speed. A cover 269, having spaced openings therein to allow rolls 260 and 262 to project therethrough, encloses the hubs of rolls 260 and 262 and gears 244, 264, 266 and 268. A wire bail 263, supported at one end by frame 68 projects across the face of, and closely adjacent to, furnishing roll 262 to prevent the strand of yarn being wound from becoming entangled therewith during the threading operation. It will, therefore, be seen that when the apparatus is in operation, rotational movement will be transmitted from shaft 82 to shaft 242 by means of belt 248 and pulleys 38 and 246. Shaft 242 in turn, by means of gears 244, 264, 266 and 268, will rotate furnishing rolls 260 and 262 to permit them to advance a strand of yarn wrapped around them.

Because all of the above described apparatus functions inside of the balloon generated by the strand being twisted, it is desirable that the furnishing rolls 260 and 262 be threaded automatically at a predetermined point in the operating cycle of the device. To this end a shaft 270 is journaled in, and extends longitudinally of, leg 78 of frame 68. One end of shaft 270 extends through end plate 72, is journaled therein, and has pulley 272 fixedly mounted thereon outside said end plate 72. The inner end of shaft 270 is supported by means of a suitable bearing in leg 78 and carries a worm, not shown, in engagement with worm gear 238. Pulley 272 and shaft 270 are driven by pulley 153 (Fig. 3) carried by shaft 150 by means of belt 274. Shaft 270, by means of its worm, drives worm gear 238 and through it sleeve 232 and ratchet wheel 230 carried thereby.

Figure 11:
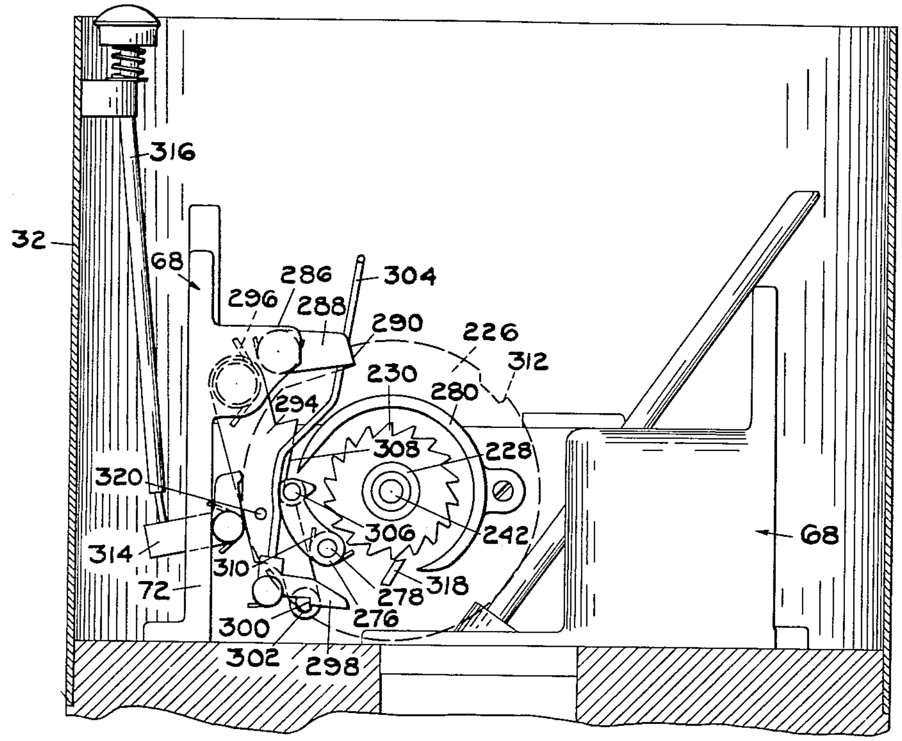
Fig. 11 is a fragmentary sectional view taken along the line XI—XI of Fig. 7, looking in the direction of the arrows, and having the furnishing rolls omitted but showing their housing in dotted lines to show the mechanism for operating the furnishing rolls.
Figures 12, 13:
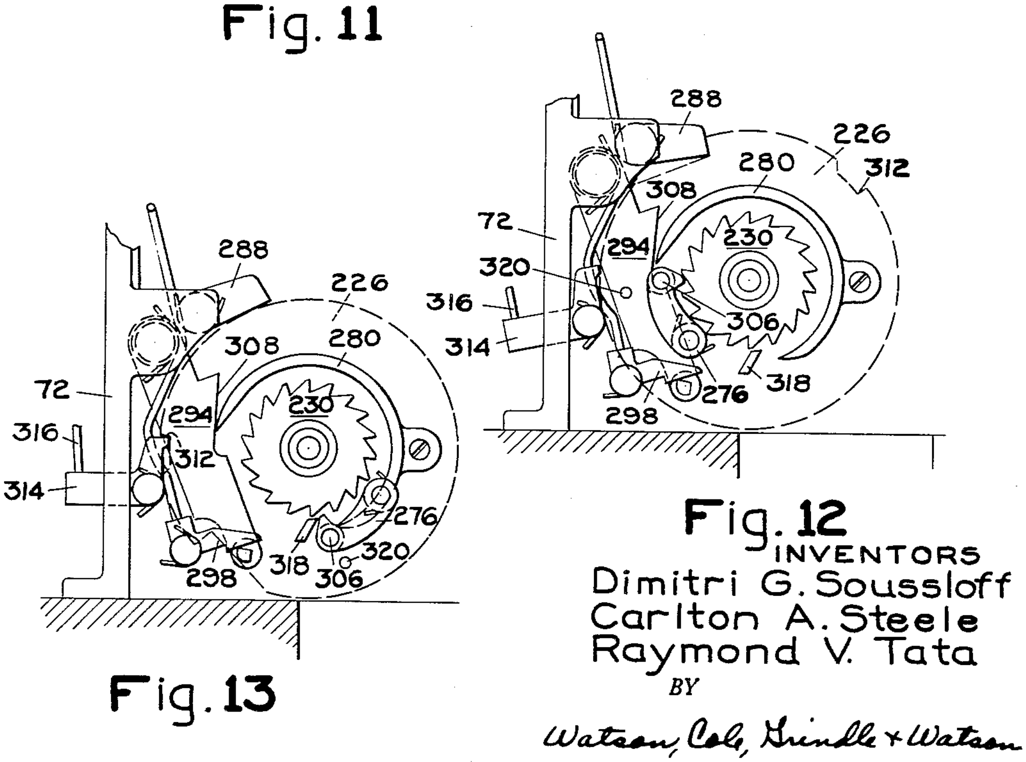
Fig. 12 is a view similar to Fig. 11 but with some of the parts omitted and showing the furnishing roll operating mechanism immediately after it has been tripped.
Fig. 13 is a view similar to Fig. 12 but showing the mechanism in the position it assumes after the furnishing rolls have been threaded.

A ratchet-engaging pawl 276 is pivotally mounted, by means of pin 278, on the back of circular housing member 226 for selectively engaging and disengaging ratchet wheel 230 to cause said ratchet wheel 230 to rotate said housing member 226, and with it furnishing rolls 260 and 262, through a predetermined number of degrees to automatically wrap the yarn being wound around said rolls 260 and 262, as will be described more in detail hereinafter. A pawl-controlling cam 280, having the shape of a segment of a circle, is carried on the outer surface of wall 79 of frame 68 around ratchet 230 and substantially concentric therewith. Cam 280 is so oriented on wall 79 that its opening is directed toward pawl 276 when the furnishing roll assembly 224 is in the cocked position prior to threading as illustrated in Figs. 5 and 11. A spring pressed latch 288, pivotally carried by an inwardly extending ear 286 formed on end plate 72, is adapted to bear against the periphery of the circular housing member 226 and engage shoulder 290 formed in the periphery of said circular housing member 226 to prevent rotation of said housing 226, and furnishing roll assembly 224, in a counterclockwise direction, as viewed in Figs. 5 and 11, past its cocked position when it is rotated from its operating position to its cocked position in preparation for threading the apparatus. A depending pawl-actuating lever 294, also pivotally mounted on ear 286, is urged by means of helical spring 296, carried by its pivoted end, towards pawl 276. A bell crank shaped latch 298 is pivotally mounted on wall 79 of frame 68 with one of its legs generally horizontal and extending in the direction of circular housing member 226, and its other leg extending upwardly. A latching shoulder 300 formed in the bottom edge of the horizontal leg of latch 298 is adapted to engage a detent 302 carried by the lower end of pawl-actuating lever 294 to retain said lever 294 in retracted position. A tripping wire 304 is attached to the upper arm of latch 298 and extends upwardly to a level above furnishing roll assembly 224 and thence extends forwardly until its end projects across the path the yarn travels as it is traversed by yarn guide 186. A cam-following detent 306 is carried by the head of pawl 276 and, in the cocked position of the furnishing roll assembly, illustrated in Fig. 11, detent 306 is held in contact with cam surface 308, formed on the adjacent edge of pawl-actuating lever 294, by means of helical spring 310 carried by pawl 276 and its pivot pin 278. A second latching shoulder 312 formed in the periphery of circular housing member 226 is spaced from shoulder 290 an arcuate distance, taken counterclockwise, equal to the rotation desired by the furnishing roll assembly 224 to wrap the yarn around furnishing rolls 260 and 262. A spring pressed latch 314 pivotally carried by end plate 72 is adapted to engage latching shoulder 312 to hold the furnishing roll assembly 224 in its threaded and operating position. A manually operated push rod 316, supported by cylindrical guard 32 engages latch 314 and functions on being depressed to release said latch 314 from shoulder 312 to permit furnishing roll assembly 224 to return from its operating position to its cocked position preparatory to threading the apparatus. A pawl-disengaging cam 318 is carried by wall 79 adjacent the exit end of pawl-controlling cam 280 but spaced therefrom a distance at least equal to the diameter of cam-following detent 306. A pawl-restraining stop 320 carried by circular housing member 226 is so located thereon that pawl 276 is held against the action of its spring 310 in a position retracted from ratchet wheel 230 and wherein cam-following detent 306 will pass outside of pawl-controlling cam 280 when the furnishing roll assembly 224 is returned to cocked position. A helical spring 292, adapted to rotate furnishing roll assembly 224 from its operating position to its cocked position preparatory to threading the apparatus, is coiled around hollow shaft 228 and has one of its ends anchored in bushing 236 and its other end anchored in locking ring 240.

A complete cycle in the operation of the twisting and winding apparatus will now be described. The apparatus is threaded by introducing the end of a strand of yarn, preferably directly from the output of a synthetic fiber producing apparatus but which can be from any convenient source of supply, into or adjacent to the opening of radial bore 23 in flyer 18. Air valve 222 is then opened to cause a stream of air to pass through conduit 220, hollow spindle 10 and tube 216 at high velocity to rotate turbine wheel 178 and to create a low pressure area in the bore of spindle 10 adjacent annular shoulder 15 and radial hole 25. Air drawn into the bore of spindle 10 through radial bore 23 carries with it the end of the yarn. When the end of the yarn enters the bore of hollow spindle 10 it is picked up by the stream of air and carried by it up through spindle 10 and slotted goose-necked threading tube 216 and discharged against circumferentially spaced pins 179 on waste take-up roll 176. The yarn becomes entangled in pins 179 which, together with the cylindrical shell 180, are being rotated at high speed by turbine wheel 178 and is wound on circumferential shell 180.

As soon as the operator of the apparatus sees that the yarn is being wound on cylindrical shell 180, the electrical circuit to motor 12 is closed to start the motor 12 and to thereby rotate flyer 18 and cylindrical shell 24 to insert twist in the yarn in a well-known manner. Also, as soon as motor 12 starts, the winding and furnishing mechanism of the apparatus is placed in operation by reason of the vertical power take-off shaft 66 which is driven by spindle 10 through pulleys 56 and 60 and belt 58. Shaft 66 in turn drives shaft 82 by means of worm 84 and worm gear 86. Shaft 82 drives shaft 98 and pulleys 100 and 102 carried thereby by means of worm 90 and worm gear 96, ribbon breaker 104 and pulley 118 carried thereby by means of worm 128 and a worm gear carried by shaft 126, and crank block 132 by means of worm 130 and worm gear 131. Barrell cam 140, which moves yarn guide 186 longitudinally of arbor 168 is rotated by means of pulley 118 (Fig. 4) carried by ribbon breaker 104, pulley 144 carried by shaft 142 and belt 146. Driving roll 148 is rotated by pulley 100 carried by shaft 98, pulley 156 carried by drive roll shaft 150 and belt 160. Rotary yarn guide 192 is rotated by pulley 102 carried by shaft 98 acting through idler pulleys 202 and 204, pulley 196 and belts 198 and 200. Furnishing rolls 260 and 262 are rotated by shaft 242 through gears 244, 264 and 266. Shaft 242 is itself rotated by shaft 82 by means of pulleys 88 and 246 and belt 248. Ratchet wheel 230 is rotated by shaft 270 acting through a worm and worm gear 238, and shaft 270 is rotated by drive roll shaft 150 by means of pulleys 158 and 272 and belt 274.

Cylindrical shell 180 in winding the yarn exerts a tension thereon which pulls it to the inner edge of tube 216 and causes it to pass out through slot 218 therein. As the yarn travels down slot 218, it falls across rotary yarn guide 192 and is picked up by screw thread 206 formed thereon, and the rotation of said rotary yarn guide 192 causes screw thread 206 to slowly traverse the yarn across cylindrical shell 180. When the yarn leaves screw thread 206, it slides along rotary yarn guide 192, leaves cylindrical shell 180 and passes onto package core 169 which is being rotated by driving roll 148 and which continues to wind it. Continued movement of the yarn along the rotary yarn guide 192 causes it to contact and to be engaged by screw thread 208. Screw thread 206 is of such a length and rotary yarn guide 192 is rotating at such a speed that the yarn does not pass from cylindrical shell 180 onto package core 169 until spindle 10 and flyer 18 are up to the predetermined desired speed and are inserting the desired number of turns per unit length in the yarn. When the yarn is engaged by screw thread 208, it is slowly traversed thereby along the extreme end portion of package core 169 to wind a transfer tail thereon. After the desired transfer tail has been formed, the yarn leaves screw thread 208 and slides out along the smooth end portion of rotary yarn guide 192 and is picked up by self-threading yarn guide 186 and is carried thereby toward the left hand end of package core 169 is viewed in Fig. 5. As the yarn is moved to the left it drops off the end of rotary yarn guide 192 and lies across wire bail 263 which prevents it from becoming entangled with, and guides it across, furnishing roll 262. By the time the yarn reaches the end of rotary yarn guide 192 and drops on bail 263 it has been drawn completely out of tube 216 through slot 218 and extends directly from the base of said tube to yarn guide 186. As the yarn continues to travel toward the left it slides off the end of wire bail 263 and drops between furnishing rolls 260 and 262. Immediately after dropping between said furnishing rolls 260 and 262 the yarn contacts the forwardly bent end of tripping wire 304 and moves it to the left, thus rotating latch 298 counterclockwise about its pivot point, as viewed in Fig. 11, to release detent 302. Immediately upon release of detent 302, pawl actuating lever 294 is rotated in a counterclockwise direction by its spring 296, whereby its cam surface 308 presses on cam following detent 306 to rotate pawl 276 into engagement with ratchet wheel 230. The engagement of pawl 276 with ratchet wheel 230 causes said ratchet wheel to rotate circular housing member 226, and through it the entire furnishing roll assembly 224, in a clockwise direction. As pawl 276 is carried around by ratchet wheel 230, cam following detent 306 carried thereby engages the inner surface of pawl controlling cam 280 which prevents the pawl from disengaging the ratchet wheel. When the furnishing roll assembly 224 has been rotated through the desired number of degrees, latching shoulder 312 is in position to be engaged by, and is engaged by, latch 314 to prevent return of the furnishing roll assembly 224 to its cocked position. At the same time that latch 314 engages shoulder 312, cam following detent 306 passes beyond the end of pawl controlling cam 280 and is disengaged from ratchet 230 by helical spring 310 to stop further rotation of the assembly 224. In the event helical spring 310 does not disengage pawl 276 from ratchet wheel 230, detent 306 will strike pawl disengaging cam 318 which will lift said pawl out of engagement with the said ratchet. The leading end of pawl controlling cam 280 is engaged by the cam surface 308 on pawl-actuating lever 294 to prevent its interfering with the operation of the furnishing roll assembly and to maintain it in the proper position for recocking.

The rotation of furnishing roll assembly 224 rotates furnishing rolls 260 and 262 in a clockwise direction to their dotted line position, Fig. 5, and causes the yarn to be wrapped around roll 262 for approximately 270 degrees of its circumference and to be wrapped around roll 260 a substantially similar distance which will vary depending upon the position of yarn guide 186.

It will be understood that the rotation of the furnishing roll assembly 224 to wrap the yarn around rolls 260 and 262 winds helical springs 292 and places it under tension. The tendency of helical spring 292 to unwind would normally rotate the furnishing roll assembly 224 in a counterclockwise direction but it is prevented from doing so by latch 314 which engages shoulder 312. When it is desired to reset the furnishing roll assembly 224 prior to threading the apparatus, push rod 316 is depressed to release latch 314 from shoulder 312. When the restraining action of latch 314 is removed spring 292 rotates the furnishing roll assembly 224 in a counterclockwise direction, as viewed in Fig. 5, until spring pressed latch 288 engages shoulder 290 in the periphery of circular housing member 226.

Inasmuch as pawl 276 is, at the start of the resetting cycle, completely retracted from ratchet 230 and in engagement with pawl restraining stop 320, cam following detent 306 passes along the outer surface of pawl controlling cam 280 as the furnishing roll assembly 224 rotates in a counterclockwise direction. As cam following detent 306 approaches the leading edge of pawl controlling cam 280 it comes in contact with the cam surface 308 on the edge of pawl actuating lever 294, and its continued movement along said cam surface 308, supported by pawl controlling cam 280, moves said pawl actuating lever in a clockwise direction until detent 302 carried thereby is engaged by shoulder 300 of latch 298.

As stated above the twisting and winding spindle of the present invention is primarily intended for use in connection with a continuous process rayon spinning apparatus to twist the output of such an apparatus and wind it into a usable package. It is necessary that the twisting and winding spindles, when thus used in connection with a continuous process rayon spinning apparatus, operate substantially in synchronism with said spinning apparatus, i. e. the spindle must twist and wind each strand of yarn at the same speed that it is produced. Failure to so operate will result in yarn breaks, snarled yarn and loss of yarn. For example, if the winding and twisting spindle operates at a higher speed than the rayon spinning apparatus, i. e. winds the yarn faster than it is produced, the yarn will be broken, and if it operates slower, i. e. does not wind the yarn as fast as it is produced, slack will accumulate between it and the spinning apparatus which will snarl and cause the yarn to break.

Figure 14:
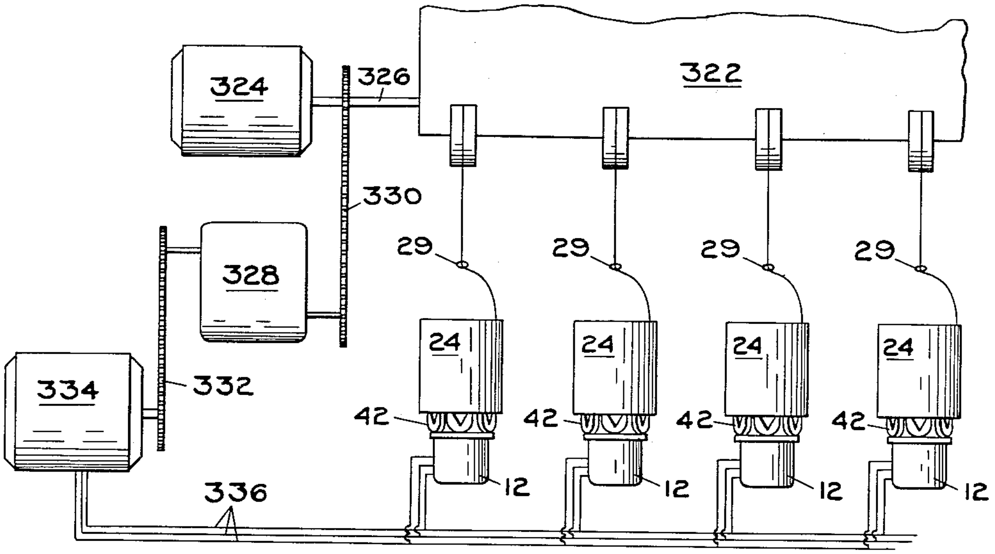
Fig. 14 is a diagrammatic view of an apparatus for continuously spinning and treating a rayon yarn and twisting and winding tthe yarn spun and treated.

Fig. 14 is a diagrammatic view of a preferred manner of synchronizing a plurality of the twisting and winding spindles of the present invention with a continuous process rayon spinning apparatus. Fig. 14 discloses diagrammatically the discharge end of one form of continuous process rayon spinning apparatus 322 and its main driving motor 324 which transmits power thereto by means of drive shaft 326. Motor 324, acting through drive shaft 326 and suitable connections within the apparatus 322, drives the pumps which force the spinning fluid through spinnerets to form the yarn and also actuates the various takeup reels and rolls within the apparatus which continuously collect the yarn as it is extruded from the spinnerets and pass it through suitable treating and conditioning operations. It will, therefore, be seen that the yarn, as it emerges from spinning apparatus 322, travels at a speed which is a function of the speed of motor 324. It will also be seen that as long as motor 324 operates at a constant speed, yarn will be produced at a constant speed, and that as the speed of motor 324 varies, however slightly, due to variations in the load, variations in the line voltage, etc., the speed of the yarn being produced will vary. A variable speed transmission 328 is driven by motor 324 by means of sprocket chain 330 which engages sprocket wheels carried by drive shaft 326 and the power input shaft of transmission 328. The power output shaft of variable speed transmission 328, through sprocket chain 332 and suitable sprocket wheels, drives an alternating current generator 334. The alternating current generated by generator 334 is conducted by means of conductors 336 to synchronous electric motors 12 which drive the individual twisting and winding spindles. It will, therefore, be seen that as motor 324 drives the continuous process apparatus 322, it also drives generator 334 and that the frequency of the current thus generated will be directly proportional to the speed of said motor.

The twisting and winding spindles can be brought into accurate synchronism with the output of spinning apparatus 324 by adjusting the speed of generator 334 with respect to the speed of motor 324 by means of variable speed transmission 328. It will also be apparent to those skilled in the art, that once the twisting and winding spindles are synchronized with the output of spinning apparatus 322, they will remain in synchronism regardless of any fluctuations in the speed of motor 324, inasmuch as any such fluctuation in speed is transmitted to generator 334 causing the frequency of the current generated thereby to either increase or decrease and thus speed up or slow down synchronous motors 12 in step with spinning apparatus 322.

An alternate method of synchronizing the twisting and winding apparatus of the present invention comprises employing twisting and winding spindles that are belt driven as opposed to winding and twisting spindles driven by synchronous electric motors.

Figure 15:
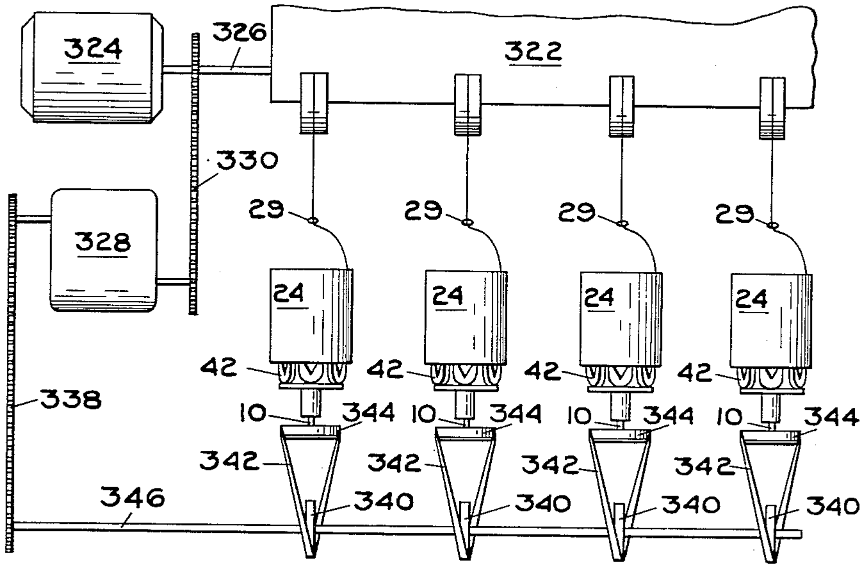
Fig. 15 is a view similar to Fig. 14 but illustrates a modification thereof.

Fig. 15 is a diagrammatic showing of a preferred method of synchronizing a plurality of belt driven twisting and winding spindles with the output of a continuous process rayon spinning apparatus 322. The embodiment disclosed in Fig. 15 is similar to the embodiment disclosed in Fig. 14 insofar as main driving motor 324 also drives a variable speed transmission 328 by means of a chain 330 and sprocket wheels. The output of variable speed transmission 328, however, is in this second embodiment connected directly to a line shaft 346 by means of a chain 338 and suitable sprocket wheels. A plurality of pulleys 340 are equally spaced along line shaft 346 each in alignment with one of the twisting and winding spindles. Belts 342 provide a driving connection between pulleys 340 and pulleys, or whorls, 344 carried by hollow spindle 10. It will, therefore, be seen that as motor 324 drives the continuous process rayon spinning apparatus 322, it also, by means of chain 330, variable speed transmission 328, chain 338, line shaft 346, pulleys 340 and belts 342, drives the twisting and winding spindles. The twisting and winding spindles can be accurately synchronized with the output of spinning apparatus 322 by means of variable speed transmission 328. Once the spindles are synchronized with the output of spinning apparatus 322, they will remain in synchronism regardless of any variation in the speed of motor 324 inasmuch as any variations in motor speed will be immediately transmitted to them.

Since certain changes may be made in the above process and apparatus without departing from the scope of the invention herein involved, it is intended that all matter contained in the above description or shown in the accompanying drawing shall be interpreted as illustrative and not in a limiting sense.

What is claimed is:

1. A device for twisting and winding yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it has been twisted by said spindle, a yarn guide reciprocally mounted on said supporting member for movement longitudinally of said arbor, and a cylindrical member adapted to rotate independently of said arbor to wind and store said yarn prior to it being wound on said arbor.

2. A device for twisting and winding yarn comprising a rotary spindle, a flyer carried by said spindle, said spindle and flyer cooperating to provide a passageway for said yarn, a platform mounted on the upper end of said spindle and having an opening therein in communication with said passageway, means to hold said platform against rotation by said spindle, an arbor rotatably mounted on said platform and adapted to wind said yarn into a package, a yarn guide reciprocally mounted on said platform for movement longitudinally of said arbor, and a cylindrical member adapted to rotate independently of said arbor to wind and store said yarn prior to it being wound on said arbor.

3. A device for twisting a running strand of yarn and winding the twisted yarn into a package provided with a transfer tail comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supoprting member and adapted to wind said yarn into a package after it is twisted by said spindle, a yarn guide reciprocally mounted on said supporting member for movement longitudinally of said arbor and adapted to engage said yarn and traverse it along said arbor, and a second yarn guide mounted on said supporting member and adapted to traverse said yarn adjacent an end of said arbor whereby it is wound thereon to form said transfer tail prior to its engagement by said first mentioned yarn guide.

4. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, a drum rotatably mounted on said supporting member, a driving connection between said spindle and said drum whereby rotation of said spindle rotates said drum, an arbor rotatably mounted on said supporting member and adapted to be rotated by said drum whereby said arbor is capable of winding said yarn after it is twisted by said spindle, a yarn guide mounted on said supporting member and adapted to traverse said yarn longitudinally of said arbor, a cylindrical member adapted to be rotated independently of said arbor and said drum by a stream of air to wind and store said yarn prior to it being wound on said arbor, and means for directing said stream of air against a portion of said cylindrical member.

5. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, and means for rotating said cylindrical member.

6. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, and means adapted to transfer said yarn from said cylindrical member to said arbor after a predetermined length thereof has been wound thereon.

7. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, means for rotating said cylindrical member, and means adapted to transfer said yarn from said cylindrical member to said arbor after a predetermined length thereof has been wound thereon.

8. A device for twisting and winding a running strand of yarn comprising a hollow rotatable spindle adapted to twist said yarn, said spindle having a radial opening therein forming a passageway for said yarn into the hollow bore thereof, a supporting member mounted on said spindle and having a passageway for said yarn formed therein in alignment with the bore of said spindle, means for holding said supporting member against rotation by said spindle, an arbor rotatably mounted on said supporting member and adapted to wind said yarn into a package after it is twisted by said spindle, a yarn guide reciprocally mounted on said supporting member for movement longitudinally of said arbor, and means comprising a hollow body extending from the passageway in said supporting member to adjacent said arbor adapted to conduct said yarn from said last mentioned passageway to said arbor.

9. A device for twisting and winding a running strand of yarn comprising a hollow rotatable spindle adapted to twist said yarn, the bore of said spindle having one diameter throughout a predetermined length thereof and having a larger diameter throughout the remainder thereof whereby an annular shoulder is provided in said bore, said spindle having a radial opening adjacent said annular shoulder forming a passageway for said yarn into said bore, a supporting member mounted on said spindle and having a passageway for said yarn formed therein in alignment with the bore of said spindle, means for directing a stream of air through said hollow spindle whereby said strand of yarn is sucked into said radial opening and discharged from the bore of said spindle through said passageway, means for holding said supporting member against rotation by said spindle, an arbor rotatably mounted on said supporting member and adapted to wind said yarn after it is twisted by said spindle, and a yarn guide mounted on said supporting member and adapted to traverse said yarn longitudinally of said arbor.

10. A device for twisting and winding a running strand of yarn comprising a rotatable spindle adapted to twist said yarn, said spindle having an opening therein forming a passageway for said yarn, a supporting member mounted on said spindle and having a passageway for said yarn formed therein in alignment with said passageway in said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, and means for conducting said yarn from said passageway in said supporting member to said cylindrical member.

11. A device for twisting and winding a running strand of yarn comprising a rotatable spindle adapted to twist said yarn, said spindle having an opening therein forming a passageway for said yarn, a supporting member mounted on said spindle and having a passageway for said yarn formed therein in alignment with said passageway in said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, and means comprising a hollow body extending from the passageway in said supporting member to closely adjacent said cylindrical member adapted to conduct said yarn from said passageway to said cylindrical member.

12. A device for twisting and winding a running strand of yarn comprising a rotatable hollow spindle adapted to twist said yarn, said spindle having a radial opening therein forming a passageway for said yarn into the hollow bore thereof, a supporting member mounted on said spindle and having a passageway for said yarn formed therein in alignment with the bore of said spindle, an arbor rotatably mounted on said supporting member and adapted to wind said yarn into a package after it is twisted by said spindle, a yarn guide mounted on said supporting member for movement longitudinally of said arbor, a cylindrical member adapted to rotate independently of said arbor to wind and store said yarn prior to it being found on said arbor, and means comprising a hollow body extending from the passageway in said supporting member to closely adjacent said cylindrical member adapted to conduct said yarn from said passageway to said cylindrical member.

13. A device for twisting and winding a running strand of yarn comprising a rotatable spindle adapted to twist said yarn, said spindle having an opening therein forming a passageway for said yarn, a supporting member mounted on said spindle and having a passageway for said yarn formed therein in alignment with said passageway in said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, and means comprising a hollow body slotted throughout its length and extending from the passageway in said supporting member to closely adjacent said cylindrical member adapted to conduct said yarn from said last mentioned passageway to said cylindrical member.

14. A device for twisting and winding a running strand of yarn comprising a rotatable spindle adapted to twist said yarn, said spindle having an opening therein forming a passageway for said yarn, a supporting member mounted on said spindle and having a passageway for said yarn formed therein in alignment with said passageway in said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, means comprising a hollow body slotted throughout its length and extending from the passageway in said supporting member to closely adjacent said cylindrical member adapted to conduct said yarn from said last mentioned passageway to said cylindrical member, and means for rotating said cylindrical member.

15. A device for twisting and winding a running strand of yarn comprising a rotatable spindle adapted to twist said yarn, said spindle having an opening therein forming a passageway for said yarn, a supporting member mounted on said spindle and having a passageway for said yarn formed therein in alignment with said passageway in said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, means comprising a hollow body slotted throughout the length and extending from the passageway in said supporting member to closely adjacent said cylindrical member adapted to conduct said yarn from said last mentioned passageway to said cylindrical member, and means for causing said yarn to transfer from said cylindrical member to said arbor after a predetermined length thereof has been wound thereon.

16. A device for twisting and winding a running strand of yarn comprising a rotatable spindle adapted to twist said yarn, said spindle having an opening therein forming a passageway for said yarn, a supporting member mounted on said spindle and having a passageway for said yarn formed therein in alignment with said passageway in said spindle, an arbor rotatably mounted on said supporting member and adapted to wind said yarn into a package after it is twisted by said spindle, a yarn guide reciprocally mounted on said supporting member for movement longitudinally of said arbor, a cylindrical member adapted to rotate independently of said arbor to wind and store said yarn prior to it being wound on said arbor, means comprising a hollow body slotted throughout its length and extending from the passageway in said supporting member to closely adjacent said cylindrical member adapted to conduct said yarn from said last mentioned passageway to said cylindrical member, means for rotating said cylindrical member, and means for causing said yarn to transfer from said cylindrical member to said arbor after a predetermined length thereof has been wound thereon.

17. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn after it is twisted by said spindle, a yarn guide mounted on said supporting member and adapted to traverse said yarn longitudinally of said arbor, and means including a valve adapted to direct a stream of air through said passageway whereby the starting end of said strand of yarn is threaded through said passageway for subsequent engagement by said yarn guide.

18. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, and means for threading an end of yarn through said passageway and onto said cylindrical member.

19. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, and means for directing a stream of air through said passageway whereby an end of yarn is threaded through said passageway and discharged onto said cylindrical member.

20. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, and means for rotating said cylindrical member and threading an end of yarn through said passageway and onto said cylindrical member.

21. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, means for threading an end of yarn through said passageway and into engagement with said cylindrical member, and means adapted to transfer said yarn from said cylindrical member to said arbor after a predetermined length thereof has been wound thereon.

22. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, means for rotating said cylindrical member and threading an end of yarn through said passageway and onto said cylindrical member, and means adapted to transfer said yarn from said cylindrical member to said arbor after a predetermined length thereof has been wound thereon.

23. A device for twisting and winding a running strand of yarn comprising a rotatable spindle adapted to twist said yarn, said spindle having an opening therein forming a passageway for said yarn, a supporting member mounted on said spindle and having a passageway for said yarn formed therein in alignment with said passageway in said spindle, an arbor rotatably mounted on said supporting member and adapted to wind said yarn after it is twisted by said spindle, a yarn guide reciprocally mounted on said supporting member and adapted to traverse said yarn longitudinally of said arbor, a cylindrical member adapted to rotate independently of said arbor to wind and store said yarn prior to it being wound on said arbor, means providing a passageway for said yarn between the passageway in said supporting member and said cylindrical member, and means for threading an end of yarn through said passageways and onto said cylindrical member.

24. A device for twisting and winding a running strand of yarn comprising a rotatable hollow spindle adapted to twist said yarn, said spindle having a radial opening therein forming a passageway for said yarn into the hollow bore thereof, a supporting member mounted on said spindle and having a passageway for said yarn formed therein in alignment with the bore of said spindle, an arbor rotatably mounted on said supporting member and adapted to wind said yarn after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, a hollow body extending from the passageway in said supporting member to closely adjacent said cylindrical member, and means for directing a stream of fluid through the bore of said spindle whereby an end of yarn is drawn into said bore through the passageway in said spindle and discharged through said second mentioned passageway and said hollow body onto said cylindrical member.

25. A device for twisting and winding a running strand of yarn comprising a rotatable hollow spindle adapted to twist said yarn, said spindle having a radial opening therein forming a passageway for said yarn into the hollow bore thereof, a supporting member mounted on said spindle and having a passageway for said yarn formed therein in alignment with the bore of said spindle, an arbor rotatably mounted on said supporting member and adapted to wind said yarn after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, a hollow body extending from the passageway in said supporting member to closely adjacent said cylindrical member, and means for directing a stream of air through the bore of said spindle whereby an end of yarn is drawn into said bore through the passageway in said spindle and discharged through said second mentioned passageway and said hollow body onto said cylindrical member.

26. A device for twisting and winding a running strand of yarn comprising a rotatable hollow spindle adapted to twist said yarn, said spindle having a radial opening therein forming a passageway for said yarn into the hollow bore thereof, a supporting member mounted on said spindle and having a passageway for said yarn formed therein in alignment with the bore of said spindle, an arbor rotatably mounted on said supporting member and adapted to wind said yarn after it is twisted by said spindle, a yarn guide mounted on said supporting member and adapted to traverse said yarn longitudinally of said arbor, a cylindrical member adapted to rotate independently of said arbor to wind and store said yarn prior to it being wound on said arbor, a hollow body extending from the passageway in said supporting member to closely adjacent said cylindrical member, and means for directing a stream of air through the bore of said spindle whereby said cylindrical member is caused to rotate and an end of yarn is drawn into said bore through the passageway in said spindle and discharged through said second mentioned passageway and said hollow body onto said cylindrical member.

27. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to traverse said yarn longitudinally of said arbor, movable tension relieving means movable from a position out of engagement with said yarn to a position wherein it engages said yarn, and means located in the path of said yarn as it is traversed by said yarn guide and adapted to be engaged and actuated moved by said yarn to cause said tension relieving means to move from said first mentioned position to said second mentioned position.

28. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to traverse said yarn longitudinally of said arbor, a furnishing roll assembly including a furnishing roll mounted on said supporting member for rotation from a position wherein said roll does not engage said yarn to a position wherein it does engage the yarn, means located in the path of said yarn as it is traversed by said yarn guide adapted to be engaged and moved by said yarn as it is traversed by said yarn guide, and means actuated by the movement of said last mentioned means for rotating said furnishing roll assembly from said first mentioned position to said second mentioned position to cause said furnishing roll to engage said yarn.

29. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to traverse said yarn longitudinally of said arbor, a furnishing roll assembly including a plurality of furnishing rolls mounted on said supporting member for rotation from a position wherein said rolls do not engage said yarn to a position wherein they do engage the yarn, means for rotating said furnishing roll assembly to cause said furnishing rolls to engage said yarn, and means located in the path of said yarn as it is traversed by said yarn guide adapted to be moved by said yarn to cause said rotating means to rotate said furnishing roll assembly from said first mentioned position to said second mentioned position.

30. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindles, an arbor rotatably mounted on said supporting member and adapted to wind said yarn into a package after it is twisted by said spindle, a yarn guide mounted on said supporting member and adapted to traverse said yarn longitudinally of said arbor, a furnishing roll assembly rotatably mounted on said supporting member and including a plurality of rotatable furnishing rolls adapted to rotate about axes parallel to the axis of rotation of said assembly, said furnishing roll assembly being rotatable from a position wherein said rolls do not engage said yarn to a position wherein they do engage the yarn, means for rotating said furnishing roll assembly to cause said furnishing rolls to engage said yarn, means located in the path of said yarn as it is traversed by said yarn guide adapted to be moved by said yarn to cause said rotating means to rotate said furnishing roll assembly from said first mentioned position to said second mentioned position, and means to rotate said furnishing rolls.

31. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to traverse said yarn longitudinally of said arbor, means for threading an end of yarn through said passageway and onto said arbor, movable tension relieving means mounted on said supporting member between said passageway and said arbor and movable from a position out of engagement with said yarn to a position wherein it engages said yarn, and means located in the path of said yarn as it is traversed by said yarn guide and adapted to be engaged and moved by said yarn to cause said tension relieving means to move from said first mentioned position to said second mentioned position.

32. A self-threading furnishing mechanism for use with an apparatus for handling a strand of yarn comprising a plurality of rolls, a rotatable supporting member, means rotatably mounting said rolls on said supporting member, means adapted to rotate said rolls, means adapted to rotate said supporting member, and means adapted to rotate said supporting member in a direction opposite the rotation imparted by said last mentioned means.

33. A self-threading furnishing mechanism for use with an apparatus for handling a strand of yarn comprising a plurality of rolls, a supporting member having a starting position and an operating position, means rotatably mounting said rolls on said supporting member, means adapted to rotate said rolls, means adapted to move said supporting member from its starting position to its operating position, and means to move said supporting member from its operating position to its starting position.

34. A self-threading furnishing mechanism for use with an apparatus for handling a strand of yarn comprising a plurality of rolls, a supporting member having a starting position and an operating position, means rotatably mounting said rolls on said supporting member, means adapted to rotate said rolls, means adapted to move said supporting member from its starting position to its operating position, and spring actuated means adapted to move said supporting member from its operating position to its starting position.

35. A self-threading furnishing mechanism for use with an apparatus for handling a strand of yarn comprising a rotatable supporting member, a plurality of rolls rotatably mounted on said supporting member, a ratchet wheel, means adapted to rotate said ratchet wheel, a ratchet engaging pawl pivotally mounted on said supporting member, and actuating means adapted to move said pawl into engagement with said ratchet wheel whereby said supporting member is rotated.

36. A self-threading furnishing mechanism for use with an apparatus for handling a strand of yarn comprising a rotatable supporting member, a plurality of rolls rotatably mounted on said supporting member, a ratchet wheel, means to continuously rotate said ratchet wheel, a ratchet engaging pawl pivotally mounted on said supporting member, actuating means adapted to move said pawl into engagement with said ratchet wheel whereby said supporting member is rotated thereby, and means for disengaging said pawl from said ratchet wheel when said supporting member has been rotated through a predetermined number of degrees.

37. A self-threading furnishing mechanism for use with an apparatus for handling a strand of yarn comprising a rotatable supporting member, a plurality of rolls rotatably mounted on said supporting member, a ratchet wheel, means for continuously rotating said ratchet wheel, a ratchet engaging pawl pivotally mounting on said supporting member, actuating means adapted to move said pawl into engagement with said ratchet wheel whereby said supporting member is rotated thereby, means for disengaging said pawl from said ratchet wheel when said supporting member has been rotated through a predetermined number of degrees, latch means adapted to retain said supporting member in its rotated position, and means adapted to return said supporting member to its initial position upon release of said latch means.

38. A self-threading furnishing mechanism for use with an apparatus for handling a strand of yarn comprising a rotatable supporting member, a plurality of rolls rotatably mounted on said supporting member, a ratchet wheel, means for continuously rotating said ratchet wheel, a ratchet engaging pawl pivotally mounted on said supporting member, actuating means adapted to move said pawl into engagement with said ratchet wheel whereby said supporting member is rotated, and a cam member located and arranged to engage said pawl and retain it in engagement with said ratchet wheel throughout a predetermined arcuate distance.

39. A self-threading furnishing mechanism for use with an apparatus for handling a strand of yarn comprising a rotatable supporting member, a plurality of rolls rotatably mounted on said supporting member, a ratchet wheel, means for continuously rotating said ratchet wheel, a ratchet engaging pawl pivotally mounted on said supporting member, actuating means adapted to move said pawl into engagement with said ratchet wheel whereby said supporting member is rotated from a starting position to an operating position, and an arcuate cam member substantially concentric with said ratchet wheel and adapted to engage said pawl to prevent it from disengaging said ratchet wheel during the movement of said supporting member from its starting position to its operating position.

40. A self-threading furnishing mechanism for use with an apparatus for handling a strand of yarn comprising a rotatable supporting member, a plurality of rolls rotatably mounted on said supporting member, a ratchet wheel, means for continuously rotating said ratchet wheel, a ratchet engaging pawl pivotally mounted on said supporting member, actuating means adapted to move said pawl into engagement with said ratchet wheel whereby said supporting member is rotated thereby from a starting position to an operating position, an arcuate cam member substantially concentric with said ratchet wheel and having an inner cam surface and an outer cam surface, latch means adapted to retain said supporting member in said operating position, means adapted to rotate said supporting member to said starting position upon release of said latch means, and means carried by said pawl and adapted to engage said inner cam surface during rotation of said supporting member to said operating position to prevent said pawl from disengaging said ratchet wheel prematurely and adapted to engage said outer cam surface during rotation of said supporting member to said starting position to prevent said pawl from engaging said ratchet wheel.

41. A self-threading furnishing mechanism for use with an apparatus for handling a strand of yarn comprising a rotatable supporting member, a plurality of rolls rotatably mounted on said supporting member, a ratchet wheel, means adapted to continuously rotate said ratchet wheel, a ratchet engaging pawl pivotally mounted on said supporting member, spring loaded actuating means adapted to move said pawl into engagement with said ratchet wheel whereby said supporting member is rotated thereby, and a latching member adapted to engage said actuating means to hold it in a retracted position and to be moved from said actuating means by said yarn to permit said actuating means to move said pawl into engagement with said ratchet wheel.

42. The method of twisting a strand of yarn and winding the twisted strand into a package comprising the steps of continuously rotating a loop in a running strand of said yarn to impart two turns of twist thereinto for each revolution of said loop, winding the initial run of strand inside of said rotating loop until said rotating loop is inserting a predetermined number of turns per unit length thereinto to form a first winding, and winding a subsequent run of said strand inside of said rotating loop into a second winding.

43. The method of twisting a strand of yarn and winding the twisted strand into a package comprising the steps of continuous rotating a loop in a running strand of said yarn to impart two turns of twist thereinto for each revolution of said loop, winding a portion of the twisted yarn inside of said rotating loop into a transfer tail, and winding a subsequent run of the twisted yarn into a package inside of said rotating loop adjacent said transfer tail.

44. The method of twisting a strand of yarn and winding the twisted strand into a package comprising the steps of continuously rotating a loop in a running strand of said yarn to impart two turns of twist thereinto for each revolution of said loop, winding the initial run of said strand inside of said rotating loop until said rotating loop is inserting a predetermined number of turns per unit length thereinto to form a first winding, winding the twisted strand into a transfer tail inside of said rotating loop, and winding a subsequent run of the twisted yarn into a package adjacent said transfer tail.

45. The method of twisting a strand of yarn and winding the twisted strand into a package comprising the steps of continuously rotating a loop in a running strand of said yarn to impart two turns of twist thereinto for each revolution of said loop, rotating a cylindrical member inside of said rotating loop, rotating a winding arbor inside of said rotating loop, winding the initial run of said strand on said cylindrical member until said rotating loop is inserting a predetermined number of turns per unit length in said strand, and transferring said strand from said cylindrical member to said winding arbor and winding a package thereon.

46. The method of twisting a strand of yarn and winding the twisted strand into a package comprising the steps of continuously rotating a loop in a running strand of said yarn to impart two turns of twist thereinto for each revolution of said loop, rotating a cylindrical member inside of said rotating loop, rotating a winding arbor inside of said rotating loop, winding the initial run of said strand on said cylindrical member until said rotating loop is inserting a predetermined number of turns per unit length in said strand, transferring said strand from said cylindrical member to said winding arbor, winding a transfer tail on said rotating arbor, and winding a package on said arbor adjacent said transfer tail.

47. A device for twisting and winding a running strand of yarn comprising a rotatable spindle adapted to twist said yarn, said spindle being provided with a passageway for said yarn, a supporting member mounted on said spindle, means for holding said supporting member against rotation by said spindle, means carried by said supporting member and adapted to wind said yarn into a package after it is twisted by said spindle, and a rotatable member adapted to wind said yarn prior to it being wound into said package.

48. A device for twisting a running strand of yarn and winding the twisted yarn into a package provided with a transfer tail comprising a rotatable spindle adapted to twist said yarn, said spindle being provided with a passageway for said yarn, a supporting member mounted on said spindle, means for holding said supporting member against rotation by said spindle, means carried by said supporting member and adapted to wind said yarn into a package after it is twisted by said spindle, and a yarn guide mounted on said supporting member and adapted to traverse said yarn along a predetermined portion of said second mentioned means whereby it is wound thereon to form said transfer tail prior to being wound thereon to form said package.

49. A device for twisting and winding a running strand of yarn comprising a rotatable spindle adapted to twist said yarn, said spindle being provided with a passageway for said yarn, a supporting member mounted on said spindle, means for holding said supporting member against rotation by said spindle, means carried by said supporting member and adapted to wind said yarn into a package after it is twisted by said spindle, a rotatable member adapted to wind said yarn prior to it being wound into said package, and means for threading an end of yarn through said passageway and onto said rotatable member.

50. A device for twisting and winding a running strand of yarn comprising a rotatable spindle adapted to twist said yarn, said spindle being provided with a passageway for said yarn, a supporting member mounted on said spindle, means for holding said supporting member against rotation by said spindle, means carried by said supporting member and adapted to wind said yarn into a package after it is twisted by said spindle, movable tension relieving means located between said passageway and said second mentioned means for movement from a position wherein said yarn is not engaged thereby to a position wherein it does engage the yarn, and a movable member positioned in the path of the yarn, as it is found into a package and adapted to be moved by said yarn to cause said tension relieving means to move from said first mentioned position to said second mentioned position.

51. A device for twisting and winding a running strand of yarn comprising a rotatable spindle adapted to twist said yarn, said spindle being provided with a passageway for said yarn, a supporting member means for holding said supporting member against rotation, means carried by said supporting member and adapted to wind said yarn into a package after it is twisted by said spindle, and a rotatable member adapted to wind said yarn prior to it being wound into said package.

52. A device for twisting a running strand of yarn and winding the twisted yarn into a package provided with a transfer tail comprising a rotatable spindle adapted to twist said yarn, said spindle being provided with a passageway for said yarn, a supporting member, means for holding said supporting member against rotation, means carried by said supporting member and adapted to wind said yarn into a package after it is twisted by said spindle, and a yarn guide mounted on said supporting member and adapted to traverse said yarn along a predetermined portion of said second mentioned means whereby it is wound thereon to form said transfer tail prior to being wound thereon to form said package.

53. A device for twisting and winding a running strand of yarn comprising a rotatable spindle adapted to twist said yarn, said spindle being provided with a passageway for said yarn, a supporting member, means for holding said supporting member against rotation, means carried by said supporting member and adapted to wind said yarn into a package after it is twisted by said spindle, a rotatable member adapted to wind said yarn prior to it being wound into said package, and means for threading an end of yarn through said passageway and onto said rotatable member.

54. A device for twisting and winding a running strand of yarn comprising a rotatable spindle adapted to twist said yarn, said spindle being provided with a passageway for said yarn, a supporting member, means for holding said supporting member against rotation, means carried by said supporting member and adapted to wind said yarn into a package after it is twisted by said spindle, movable tension receiving means located between said passageway and said second mentioned means for movement from a position wherein said yarn is not engaged thereby to a position wherein it does engage the yarn, and a movable member positioned in the path of the yarn as it is wound into a package and adapted to be moved by said yarn to cause said tension relieving means to move from said first mentioned position to said second mentioned position.

55. A device for twisting and winding a running strand of yarn comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to traverse said yarn longitudinally of said arbor, movable tension relieving means movable from a position out of engagement with said yarn to a position wherein it engages said yarn, a normally disengaged coupling member adapted to selectively couple said tension relieving means to said spindle whereby rotation of said spindle moves said tension relieving means from said first mentioned position to said second mentioned position, and a movable coupling engaging element located in the path of said yarn as it is traversed by said yarn guide and adapted to be moved by said yarn to thereby engage said coupling member.

56. A device for twisting a running strand of yarn and winding the twisted yarn into a package provided with a transfer tail comprising a rotatable spindle adapted to twist said yarn, said spindle having an opening therein forming a passageway for said yarn, a supporting member mounted on said spindle, means for holding said supporting member against rotation by said spindle, an arbor rotatably mounted on said supporting member and adapted to wind said yarn into a package after it is twisted by said spindle, a yarn guide mounted on said supporting member and adapted to engage said yarn and traverse it along said arbor, a furnishing roll assembly including a plurality of furnishing rolls mounted on said supporting member for movement from a first position to a second position, a second yarn guide mounted on said supporting member for guiding said yarn adjacent an end of said arbor whereby a transfer tail is wound thereon and operative upon completion of said transfer tail to position said running strand of yarn between the furnishing rolls of said furnishing roll assembly, and means located in the path of said yarn as it is traversed by said first mentioned yarn guide adapted to be moved by said yarn to cause movement of said furnishing roll assembly from said first position to said second position whereby said furnishing rolls are brought into engagement with said yarn.

57. The method of twisting a strand of yarn and winding the twisted strand into a package comprising the steps of continuously rotating a loop in a running strand of said yarn to impart two turns of twist thereinto for each revolution of said loop, winding the initial run of said strand on a cylindrical member inside of said rotating loop until said loop is inserting a predetermined number of turns per unit length thereinto to form a first winding, and winding a subsequent run of said strand on a winding arbor inside of said rotating loop to form a second winding.

58. The method of twisting a strand of yarn and winding the twisted strand into a package comprising the steps of continuously rotating a loop in a running strand of said yarn to impart two turns of twist thereinto for each revolution of said loop, winding the initial run of said strand on a cylindrical member inside of said rotating loop until said loop is inserting a predetermined number of turns per unit length thereinto to form a first winding, winding the twisted strand on a winding arbor inside of said rotating loop to form a transfer tail, and winding a subsequent run of said strand on said arbor adjacent said transfer tail to form a package.

References Cited in the file of this patent

UNITED STATES PATENTS

| | | |
|---|---|---|
| 437,022 | Dawes | Sept. 23, 1890 |
| 1,031,367 | Norman | July 2, 1912 |
| 1,031,695 | Delaney | July 9, 1912 |
| 1,858,528 | Somerville | May 17, 1932 |
| 1,900,310 | Somerville | Mar. 7, 1933 |
| 1,907,530 | Ferier | May 9, 1933 |
| 1,960,743 | Junkers | May 29, 1934 |
| 2,089,159 | Dannenberg et al. | Aug. 3, 1937 |
| 2,090,064 | Oppenlaender | Aug. 17, 1937 |
| 2,136,556 | Lovett | Nov. 15, 1938 |
| 2,416,533 | Naumann | Feb. 25, 1947 |
| 2,424,490 | Henry | July 22, 1947 |
| 2,443,231 | Elvin et al. | June 15, 1948 |
| 2,487,838 | Uhlig | Nov. 15, 1949 |
| 2,605,536 | Litzler | Aug. 5, 1952 |
| 2,621,390 | Nield | Dec. 16, 1952 |